(12) United States Patent
Okumura

(10) Patent No.: US 6,984,430 B2
(45) Date of Patent: Jan. 10, 2006

(54) POLYESTER FILM FOR RELEASE FILM

(75) Inventor: Hiroteru Okumura, Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 393 days.

(21) Appl. No.: 10/324,792

(22) Filed: Dec. 20, 2002

(65) Prior Publication Data

US 2003/0148068 A1 Aug. 7, 2003

(30) Foreign Application Priority Data

Dec. 26, 2001 (JP) .............................. 2001-393792

(51) Int. Cl.
*B32B 3/00* (2006.01)
*B32B 27/36* (2006.01)

(52) U.S. Cl. .................... 428/41.8; 428/40.1; 428/141; 428/480; 428/694 SG; 528/272; 528/308; 528/308.1; 528/308.6

(58) Field of Classification Search .......... 428/141.48, 428/694 ST, 694 SL, 694 SG
See application file for complete search history.

(56) References Cited

U.S. PATENT DOCUMENTS

| | | | |
|---|---|---|---|
| 4,514,451 A * | 4/1985 | Suzuki et al. ................ | 428/141 |
| 4,564,549 A * | 1/1986 | Suzuki et al. ................ | 428/141 |
| 4,675,233 A * | 6/1987 | Nakahara et al. ............ | 428/323 |
| 4,990,400 A * | 2/1991 | Endo et al. .................. | 428/331 |
| 5,164,439 A * | 11/1992 | Sakamoto et al. ........... | 524/425 |
| 5,474,854 A * | 12/1995 | Kagami et al. .............. | 428/482 |
| 5,520,994 A * | 5/1996 | Kayama ...................... | 428/215 |
| 5,626,942 A * | 5/1997 | Okamoto et al. ............ | 428/141 |
| 5,648,159 A * | 7/1997 | Sato ............................. | 428/327 |
| 5,763,096 A * | 6/1998 | Takahashi et al. .......... | 428/480 |
| 6,423,396 B2 * | 7/2002 | Hashimoto .................. | 428/141 |
| 6,733,873 B2 * | 5/2004 | Mizutani et al. ............ | 428/216 |

FOREIGN PATENT DOCUMENTS

| | | |
|---|---|---|
| EP | 0 654 345 A1 | 5/1995 |
| JP | 11320764 | 2/2002 |
| JP | 2001-310313 | 4/2002 |
| JP | 2002-602813 * | 6/2002 |

OTHER PUBLICATIONS

Schimtz, Peter et al., "Films." Ullmann's Encyclopedia of Industrial Chemistry, 5th Ed., vol. A11 (1988), pp. 85-95, 108-110.*

* cited by examiner

*Primary Examiner*—Vivian Chen
(74) *Attorney, Agent, or Firm*—Edwards & Angell, LLP; David G. Conlin; Lisa Swiszcz Hazzard

(57) ABSTRACT

An object of the present invention is provide a polyester film useful as base for release film according to which when a ceramic slurry is applied on the release film, formation of pinholes in the ceramic slurry layer is suppressed prominently, and also when a ceramic layer is provided on the release film, thickness variation of the ceramic layer is lessened, thus realizing excellent releasability of the release film.

A polyester film for release film, which has a maximum height of projection (Rmax) in one surface (surface A) of said polyester film, of not more than 500 nm; and has a thickness variation of not more than 5%.

9 Claims, No Drawings

POLYESTER FILM FOR RELEASE FILM

BACKGROUND OF THE INVENTION

The present invention relates to a polyester film used for release films, more particularly, it relates to a base film for release films suited for use in forming of green sheets used for stacked ceramic capacitors.

Release film comprising a polyester film as base has been used as carrier film for forming green sheets for stacked ceramic capacitors.

Miniaturization of capacitors consequent on the trend of midgetism of electronic devices in recent years has entailed reduction of thickness of ceramic green sheet itself. Under these circumstances, there is a problem that thickness variation of ceramic layer formed on the release film is remarkable and causes increasing of defect percentage. Therefore, there is a request for a release film having decreased thickness variation of ceramic layer when the ceramic layer is provided on the release film, but a film suited for such purpose is not available.

SUMMARY OF THE INVENTION

The object of the present invention is to provide a polyester film useful as base for release film according to which when a ceramic slurry is applied on the release film, formation of pinholes in the ceramic slurry layer is suppressed prominently, and also when a ceramic layer is provided on the release film, thickness variation of the ceramic layer is lessened, thus realizing excellent releasability of the release film.

As a result of the present inventors' earnest studies to attain the above aim, it has been found that the above problems can be easily solved by a film having a specific structure. The present invention has been attained on the basis of the above findings.

To attain the above aim, in the first aspect of the present invention, there is provided a polyester film for release film, which has a maximum height of projection (Rmax) in one surface (surface A) of said polyester film, of not more than 500 nm; and has a thickness variation defined by the following equation using the maximum, minimum and mean values of film thickness in the machine and transverse directions of said polyester film, of not more than 5%:

Thickness variation (%)=(maximum thickness−minimum thickness)×100/average thickness In the second aspect of the present invention, there is provided a release film comprising a polyester film and a release layer provided on one surface (surface A) of said polyester film, in which a maximum height of projection (Rmax) in the surface A of said polyester film is not more than 500 nm, and thickness variation defined by the following equation using the maximum, minimum and mean values of the film thickness in the machine and transverse directions of said polyester film is not more than 5%:

Thickness variation (%)=(maximum thickness−minimum thickness)×100/average thickness In the third aspect of the present invention, there is provided a green sheet having a ceramic layer formed by coating a ceramic slurry on the release layer of the release film as defined in the second aspect.

DETAILED DESCRIPTION OF THE INVENTION

The present invention is described in detail hereinbelow.

The "polyester" referred in the present invention designates the polymers having ester groups produced by polycondensation of dicarboxylc acids and diols or hydroxycarboxylic acids. Examples of the dicarboxylic acids usable in the present invention include terephthalic acid, succinic acid, isophthalic acid, adipic acid, azelaic acid, sebacic acid, dodecanoic diacid, 2,6-naphthalenedicarboxylic acid, and 1,4-cyclohexanedicarboxylic acid. Examples of the diols include ethylene glycol, 1,3-propanediol, 1,6-hexanediol, 1,4-butanediol, diethylene glycol, triethylene glycol, neopentyl glycol, 1,4-cyclohexane dimethanol, and polyethylene glycol. Examples of the hydroxycarboxylic acids include p-hydroxybenzoic acid and 6-hydroxy-2-naphthoic acid.

Typical examples of the said polyester are polyethylene terephthalate, polybutylene terephthalate and polyethylene-2,6-naphthalate. These polymers may be homopolymers or the ones having a third component copolymerized.

As the film in the present invention, a biaxially stretched film is preferably used in view of its high strength and excellent dimensional stability, but it is also possible to use a polyester film which is non-stretched or stretched at least in one direction.

A feature of the polyester film according to the present invention is that the maximum height of projection (Rmax) in one of its surfaces (usually the surface on the side where the release layer is provided, hereinafter referred to as "surface A") is not more than 500 nm, preferably not more than 450 nm, even more preferably not more than 400 nm. When Rmax of the surface provided with the release layer is more than 500 nm, there may take place formation of voids (pinholes) in the release layer or unevenness of coating. Extremely, Rmax may be zero.

Thickness variation of the film is not more than 5%, preferably not more than 3%, more preferably not more than 1%. When thickness variation exceeds 5%, there may occur positional deviation of the laminate when the green sheets for ceramic capacitor are laminated after forming such sheets by providing release layer and ceramic dielectric layer. There may also take place local concentration of stress in the ensuing pressing step, causing non-uniformity of electrostatic capacity.

Thickness variation is defined by the following equation using the maximum, minimum and mean values of film thickness in both machine and transverse directions of the polyester film.

Thickness variation (%)=(maximum thickness−minimum thickness)×100/average thickness As to the thickness variation in transverse directions of the polyester film, it is necessary that the thickness variation in the width of product as polyester film or release film is not more than 5%.

Preferably projections with a height of not less than 350 nm exist at a rate of not more than 200/mm² in the surface A. When the number of projections with a height of not less than 350 nm in the polyester film is more than 200 per mm², defect percentage (short circuit defect) of the ceramic capacitors tend to increase when such capacitors are made after forming green sheets by providing a release layer and a ceramic layer.

It is also preferable that SRa (A) of the surface A is not more than 20 nm while SRa (C) of the surface opposite from the surface A (this opposite side surface being hereinafter referred to as surface C) falls within the range of 10 to 50 nm, and that the relation of SRa (C)≧SRa (A) be satisfied. If SRa (A) is more than 20 nm, this may become a cause of formation of pinholes, while if SRa (C) is less than 10 nm, the produced release films may have such problems as blocking tendency and poor transportability. Also, if SRa (C) exceeds 50 nm, there may take place transfer of the surface projections to the release layer side, or so-called set-off. Extremely, SRa (A) may be zero.

In order to obtain the polyester film having Rmax, SRa and the number of projections per unit area of the polyester film within in the above-defined ranges, it is preferable to incorporate inactive fine particles, for example inorganic particles such as particles of silica, calcium carbonate, kaolin, titanium oxide, aluminum oxide, barium sulfate and zeolite, or organic particles such as particles of silicone resin, crosslinked polystyrene and acrylic resin, either singly or as a mixture in the film. In this case, no specific restrictions are imposed on the average size, amount added and size distribution of the particles used as far as these factors are within the concept of the present invention, but usually the average particle size is 0.1 to 4.0 $\mu$m, the amount of the particles added is 0.01 to 3.0% by weight, and as for particle size distribution, the dispersion is preferably as small as possible. Thickness of polyester film is usually 1 to 500 $\mu$m, preferably 12 to 75 $\mu$m.

Haze of the polyester film according to the present invention (haze of the polyester film with no release layer) is not more than 20%, preferably not more than 10%. If film haze is more than 20%, it may hinder visual check for pinholes in the green sheet using the film which is commonly conducted for the examination of green sheets.

The polyester film of the present invention may be either a single-layer film or a multilayered film as far as it does no depart from the concept of the present invention. In order to reduce the number of pinholes or non-uniformity of coating by extremely smoothing one side of the film while securing anti-block properties by roughening the side opposite from the smoothed side, it is preferable to adopt, for example, a two-material and two-layer structure or a three-material and three-layer structure with the front and back sides differing in degree of roughness. Further, by taking a film structure using different compositions for the intermediate layer and two surface layers of, for instance, a three-material and three-layer film, it may become possible to materialize the concept of the present invention by merely adding the fine particles in the surface layers alone, with no such particles being contained in the intermediate layer. This embodiment is advantageous as it allows lessening of foreign matter originating in the fine particles and reduction of production cost.

The present invention will be described in further detail concerning the process for producing the film according to the present invention, but it should be understood that the present invention is not restricted to the embodiments described below.

According to the present invention, the polyester chips dried by a conventional method are supplied to a melt extruder and melted by heating to a temperature above the melting points of the respective polymers. The molten polymers are extruded from a die and rapidly cooled to a temperature below the glass transition temperature on a rotating cooling drum and thereby solidified to obtain a non-oriented sheet of a substantially amorphous state. In this operation, it is preferable to enhance adhesion between the sheet and the rotating cooling drum for improving flatness of the sheet. For this purpose, an electrostatic pinning method and/or a liquid coating method are preferably used in the present invention.

In the present invention, the thus obtained sheet is stretched in two axial directions to form a film. Regarding the stretching conditions, the said non-stretched sheet is preferably stretched 2 to 6 times at 70 to 145° C. in the machine direction to form a monoaxially stretched film, and then it is further stretched 2 to 6 times at 90 to 160° C. in the transverse direction and then subjected to a heat treatment at 150 to 240° C. for 1 to 600 seconds. It is also preferable to relax the film 0.1 to 20% in the machine direction and/or the transverse direction in the highest temperature zone of heat treatment and/or the cooling zone at the exit of heat treatment. If necessary, it is possible to conduct re-stretching in the machine direction and/or the transverse direction.

In order to provide or improve the specific properties such as antistatic properties, weather resistance and surface hardness, the polyester film of the present invention may be subjected to so-called in-line coating in which the film stretched in the machine direction is coated before entering a tenter for stretching in the transverse direction and dried in the tenter, as far as such an operation won't affect the effect of the present invention. Also, various types of coating may be applied as desired on one or both sides of the produced film by off-line coating. As for the coating material, an aqueous type and/or a solvent type may be used for off-line coating, but an aqueous type or an aqueous dispersion type is preferred for in-line coating.

Further, in the polyester film of the present invention, there may be incorporated other types of thermoplastic resin such as polyethylene naphthalate and polytrimethylene terephthalate within limits not prejudicial to the purport of the present invention. It is also possible to contain other necessary additives such as ultraviolet absorber, antioxidant, surfactant, pigment, fluorescent brightener, etc.

In case where a release layer is provided in the polyester film of the present invention, such a layer is disposed on the surface A of the polyester film. Any material having curing properties can be used for the release layer. For instance, it is possible to use a type mainly comprising a curable silicone resin or a modified silicone type made by graft polymerization with an organic resin such as urethane resin, epoxy resin or alkyd resin. The type mainly comprising a curable silicone resin is preferred for good releasability.

Regarding the type of the curable silicone resin, it is possible to use any of the curing reaction types such as solvent added type, solvent condensed type, solvent ultraviolet-curing type, no solvent added type, no solvent condensed type, no solvent ultraviolet curing type, no solvent electronic ray curing type, etc.

Examples of such curable silicone resins commercially available are KS-774, KS-775, KS-778, KS-779H, KS-856, X-62-2422 and X-62-2461 produced by Shin-Etsu Chemical Industries Co., Ltd., DKQ3-202, DKQ3-203, DKQ3-204, DKQ3-205 and DKQ3-210 produced by Dow Corning Asia Co., Ltd., YSR-3022, TPR-6700, TPR-6720 and TPR-6721 produced by Toshiba Silicone Co., Ltd., and SD7220, SD7226 and SD7229 produced by Toray Dow Corning Co., Ltd. A release controlling agent may be further contained for adjusting releasability of the release layer.

Various known coating methods such as reverse roll coating, gravure coating, bar coating and doctor blade coating can be used for forming the release layer in the present invention. Preferred coating weight of the release layer is 0.01 to 5 g/m$^2$ for good coatability. When the coating weight is less than 0.01 g/m$^2$, coating stability may be unsatisfactory and it may become difficult to obtain a uniform coating film. On the other hand, when the coating weight exceeds 5 g/m$^2$, the release layer itself may prove unsatisfactory in coating film adhesion, coatability, etc.

A ceramic green sheet can be produced by coating a ceramic slurry on the release film of the present invention.

This ceramic slurry coating can be effected by a known method. Thickness of the ceramic slurry coating is usually 0.5 to 50 μm, preferably 0.5 to 10 μm. Thickness variation of the ceramic green sheet produced by using the release film of the present invention should be usually less than 3%, preferably less than 2%, more preferably less than 1%.

According to the present invention, as described above, there is provided a polyester film which can inhibit formation of pinholes in the ceramic slurry layer when it is provided on the release film, and which also contributes to reduction of thickness variation of the ceramic layer when it is provided on the release film. Thus, the present invention is of high industrial value.

EXAMPLES

The present invention is described in further detail by showing the examples thereof, but it should be understood that these examples are merely intended to be illustrative and not to be construed as limiting the scope of the invention. Various film properties and characteristics were determined or defined as explained below. In the following Examples and Comparative Examples, all percents (%) are by weight unless otherwise noted.

(1) Determination of Maximum Height of Projection (Rmax)

Al was deposited on the surface of a 3 cm² film specimen, and the P-V value of the surface A in the measuring region of 232 μm×177 μm was measured at 50 points by a non-contact three-dimensional roughness tester (Model 512 mfd. by Micromap Co., Ltd.) using a direct phase detecting interference method, or so-called two-beam interference method, at a measuring wavelength of 554 nm and an objective lens magnification of ×20. Average of the P-V values at 50 points was expressed as maximum height of projection (Rmax) of the specimen.

(2) Determination of the Number of Projections

After depositing Al on the surface of a 3 cm² film specimen, the number of projections having a height of 350 nm or more on the surface A in the measuring region of 232 μm×177 μm was determined from the projection height distribution curves by a non-contact three-dimensional roughness tester (Model 512 mfd. by Micromap Ltd.) using a direct phase detecting interference method, or so-called two-beam interference method, at a measuring wavelength of 554 nm and an objective lens magnification of ×20. The number of projections at 50 points was averaged and expressed as the number of projections having a height of 350 nm or more in unit area of 1 mm².

(3) Determination of Center Plane Average Roughness:

After depositing Al on the surface of a 3 cm² film specimen, center plane average roughness SRa of the surface A and that of the surface C in the measuring region of 232 μm×177 μm were determined from the projection height distribution curves by a non-contact three-dimensional roughness tester (Model 512 mfd. by Micromap Ltd.) using a direct phase detecting interference method, or so-called two-beam interference method, at a measuring wavelength of 554 nm and an objective lens magnification of ×20. The SRa values at 50 points were averaged to determine SRa of the film.

(4) Determination of Thickness Variation:

Thickness of the biaxially stretched film was measured in the machine and transverse directions by a continuous film thickness gauge (using an electronic micrometer) mfd. by Adachi Electric Co., Ltd., and thickness variation along the film length of 3 meters and film width of 1000 mm was calculated from the following equation:

$$\text{Thickness variation (\%)} = (\text{maximum thickness} - \text{minimum thickness}) \times 100 / \text{average thickness}$$

(5) Determination of Film Haze:

Film haze was measured by a hazeometer NDH-20D mfd. by Nippon Denshoku Kogyo KK according to JIS-K6714.

(6) Evaluation of Slurry Coatability:

A release agent comprising 100 parts of a curable silicone resin ("KS-779H" produced by Shin-Etsu Chemical Industries Co., Ltd.), 1 part of a curing agent ("CAT-PL-8" produced by Shin-Etsu Chemical Industries Co., Ltd.) and 2,200 parts of a methyl ethyl ketone (MEK)/toluene mixed solvent was coated on the layer A surface to a coating weight of 0.1 g/mm² to obtain a release film.

Then, a ceramic slurry of the following composition was coated on the release side of the film to a coating thickness of 5 μm in a wet state, and slurry coatability was judged according to the following rating formula.

<Ceramic Slurry Composition>

| | |
|---|---|
| Ceramic powder (barium titanate) | 100 parts |
| Binder (polyvinyl butyral resin) | 5 parts |
| Plasticizer (dioctyl phthalate) | 1 part |
| Toluene/MEK mixed solvent (mixing ratio = 1:1) | 10 parts |

<Rating for the Judgment of Slurry Coatability>
A: Slurry coatability is excellent.
B: Slurry coatability is good.
C: Slight repellance of slurry is seen.
D: Slurry is repelled.

(7) Evaluation of Ceramic Green Sheet Thickness Variation:

A release agent comprising 100 parts of a curable silicone resin ("KS-779H" produced by Shin-Etsu Chemical Industries Co., Ltd.), 1 part of a curing agent ("CAT-PL-8" produced by Shin-Etsu Chemical Industries Co., Ltd.) and 2,200 parts of a methyl ethyl ketone (MEK)/toluene mixed solvent was coated on the layer A surface to a coating weight of 0.1 g/mm² to obtain a release film.

Then, a ceramic slurry of the following composition was coated by a known method on the release side of the film to a coating thickness of 12 μm in a wet state to make a ceramic green sheet, and thickness of the ceramic layer of this ceramic green sheet in the machine and transverse directions on the film was measured by a non-contact type β-ray thickness gauge. Based on the results, judgment was made for thickness variation according to the following rating formula.

<Ceramic Slurry Composition>

| | |
|---|---|
| Ceramic powder (barium titanate) | 100 parts |
| Binder (polyvinyl butyral resin) | 5 parts |
| Plasticizer (dioctyl phthalate) | 1 part |
| Toluene/MEK mixed solvent (mixing rate: 1:1) | 10 parts |

<Rating for Green Sheet Thickness Variation>
A: Thickness variation is less than 1%.
B: Thickness variation is not less than 1% and not more than 2%.

C: Thickness variation is not less than 2% and not more than 3%.

D: Thickness variation is not less than 3%.

If the rating is C or better, there is no problem in practical use.

(8) Evaluation of Anti-block Properties of Release Film

A release agent comprising 100 parts of a curable silicone resin ("KS-779H" produced by Shin-Etsu Chemical Industries Co., Ltd.), 1 part of a curing agent ("CAT-PL-8" produced by Shin-Etsu Chemical Industries Co., Ltd.) and 2,200 parts of a methyl ethyl ketone (MEK)/toluene mixed solvent was coated on the layer A surface to a coating weight of 0.1 g/mm$^2$ to obtain a release film.

Then, the obtained release film was cut to a size of 10 cm×10 cm, and 10 pieces thereof were placed one over another in such a manner that the release side of one piece would face the side having no release layer of the adjacent piece, and pressed under the conditions of 100° C., 10 kg/cm$^2$ and one hour. The degree of occurrence of blocking at the time of separation was judged according to the following rating formula:

<Rating>

A: No trace of occurrence of blocking is admitted.

B: Occurrence of blocking is barely admitted.

C: Occurrence of blocking is admitted.

D: Occurrence of blocking is manifest.

If the rating is C or better, there is no problem in practical use.

Example 1

(Production Method of Polyester Chips)

100 parts of dimethyl terephthalate, 70 parts of ethylene glycol and 0.07 part of calcium acetate monohydrate were supplied to a reactor and heated while distilling away methanol to carry out an ester exchange reaction. The reaction mixture was heated to 230° C. in a time of approximately 4.5 hours after start of the reaction to substantially complete the ester exchange reaction.

Next, 0.04 part of phosphoric acid and 0.035 part of antimony trioxide were added, and the mixture was polymerized by a conventional method. More specifically, reaction temperature was raised gradually to finally reach 280° C. while pressure was lowered gradually to finally become 0.05 mmHg. 4 hours after that, the reaction was completed and the reaction product was made into chips by a conventional method to obtain polyester A.

In the course of production of polyester A described above, 20,000 ppm of calcium carbonate having an average particle size of 0.7 μm was added to obtain polyester B.

Further, in the course of production of polyester A described above, 20,000 ppm of amorphous silica having an average particle size of 2.4 μm was added to obtain polyester C.

Also, in the course of production of polyester A described above, 20,000 ppm of aluminum oxide having an average particle size of 0.2 μm was added to obtain polyester D.

(Production of Polyester Film)

The said polyesters A and B were mixed at the rates of 65% and 35%, respectively, to prepare mixed material 1. Using this mixed material as the material of layer A and layer C while using polyester A as the material of layer B, they were supplied respectively to the two sets of extruder and melted at 285° C. With layers A and C being schemed to constitute the outermost layers (surface layers) and layer B to constitute the intermediate layer, the molten materials were coextruded with a 2-material and 3-layer formation onto a 20° C. casting drum, and thereby cooled and solidified to obtain a non-oriented sheet. Then the sheet was stretched 3 times in the machine direction at 90° C., passed through a preheating step in a tenter, further stretched 4 times in the transverse direction at 100° C., and subjected to heat treatment at 230° C. for 10 seconds. Thickness variation of the film was measured while scanning film thickness just before taking-up of the film by a non-contact type on-line thickness gauge. Die gap was adjusted according to the determined thickness pattern to obtain a polyester film having 38 μm thickness and 1000 mm width with controlled thickness variation. Thickness of the respective layers was as shown in Table 1.

The properties of obtained polyester film are shown in Table 1. The obtained polyester film could confine thickness variation of green sheet to a defined range and also excelled in slurry coatability, anti-block properties and transparency, indicating that it was a highly practical film.

Examples 2 to 5

Polyester films were obtained in the same way as Example 1 except that the formulation and thickness of layers A and C were changed as shown in Table 1.

The properties of obtained polyester films are shown in Table 1. Any of them was a highly practical film.

Examples 6 to 8

Polyester films were obtained in the same way as Example 1 except that the mixed materials for forming the respective layers were prepared by the formulations shown in Table 1, supplied respectively to the three sets of extruder, melted each at 285° C., then coextruded with a 3-material and 3-layer formation onto a 20° C. casting drum, with layers A and C forming the outermost layers (surface layers) and layer B forming the intermediate layer, and thereby cooled and solidified to obtain non-oriented sheets. Thickness of each layer of the obtained polyester films was as shown in Table 1.

The properties of obtained polyester films are shown in Table 1. The obtained polyester films could confine thickness variation of green sheet to a defined range and also excelled in slurry coatability, anti-block properties and transparency. Any of them was a highly practical film.

Comparative Examples 1 to 3

Polyester films were obtained in the same way as Example 1 except that the formulation of layers A and C was changed as shown in Table 2.

The properties of obtained polyester films are shown in Table 2. These films were films lacking practicality.

Comparative Example 4

A polyester film was obtained in the same way as Example 1 except that the formulation and thickness of layers A and C were changed as shown in Table 2.

The properties of obtained polyester film are shown in Table 2. The obtained polyester film, although excellent in slurry coatability, anti-block properties and transparency, was unsatisfactory in thickness variation of green sheet and lacked practicality.

TABLE 1

| Example | 1 | 2 | 3 | 4 |
|---|---|---|---|---|
| Thickness (μm) | | | | |
| Layer A | 3 | 3 | 3 | 1 |
| Layer B | 32 | 32 | 32 | 32 |
| Layer C | 3 | 3 | 3 | 1 |
| Layer A formulation | | | | |
| A | 65 | 65 | 65 | 65 |
| B | 35 | 35 | 35 | 20 |
| C | — | — | — | — |
| D | — | — | — | 15 |
| Layer B formulation | | | | |
| A | 100 | 100 | 100 | 100 |
| C | — | — | — | — |
| Layer C formulation | | | | |
| A | 65 | 65 | 65 | 65 |
| B | 35 | 35 | 35 | 20 |
| C | — | — | — | — |
| D | — | — | — | 15 |
| Rmax: Surface A (nm) | 430 | 430 | 430 | 350 |
| Number of projections per mm²: Surface A (number/ mm²) | 1 | 1 | 1 | 0 |
| SRa(A) (nm) | 23 | 23 | 23 | 13 |
| SRa(C) (nm) | 23 | 23 | 23 | 13 |
| Thickness variation (%) | 4 | 2 | 0.2 | 2 |
| Film haze (%) | 6.0 | 6.0 | 6.0 | 2.5 |
| Thickness variation of green sheet | C | B | A | B |
| Slurry coatability | B | B | B | A |
| Anti-block properties | A | A | A | C |

| Example | 5 | 6 | 7 | 8 |
|---|---|---|---|---|
| Thickness (μm) | | | | |
| Layer A | 3 | 1 | 3 | 3 |
| Layer B | 32 | 32 | 32 | 28 |
| Layer C | 3 | 5 | 3 | 7 |
| Layer A formulation | | | | |
| A | 49 | 60 | 100 | 65 |
| B | 51 | 25 | — | 35 |
| C | — | — | — | — |
| D | — | 15 | — | — |
| Layer B formulation | | | | |
| A | 100 | 100 | 99 | 100 |
| C | — | — | 1 | — |
| Layer C formulation | | | | |
| A | 49 | 60 | 65 | 65 |
| B | 51 | 10 | 35 | — |
| C | — | — | — | 35 |
| D | — | 30 | — | — |
| Rmax: Surface A (nm) | 480 | 430 | 50 | 430 |
| Number of projections per mm²: Surface A (number/ mm²) | 175 | 0 | 0 | 1 |
| SRa(A) (nm) | 30 | 15 | 6 | 23 |
| SRa(C) (nm) | 30 | 21 | 25 | 58 |
| Thickness variation (%) | 2 | 2 | 0.2 | 2 |
| Film haze (%) | 6.0 | 4.2 | 4.0 | 5.8 |
| Thickness variation of green sheet | B | B | A | B |
| Slurry coatability | C | A | A | C |
| Anti-block properties | A | A | A | A |

TABLE 2

| Comparative Example | 1 | 2 | 3 | 4 |
|---|---|---|---|---|
| Thickness (μm) | | | | |
| Layer A | 3 | 5 | 2 | 3 |
| Layer B | 32 | 32 | 34 | 28 |
| Layer C | 3 | 5 | 2 | 3 |
| Layer A formulation | | | | |
| A | 92 | 49 | 94 | 100 |
| B | — | 51 | — | — |
| C | 8 | — | 6 | — |
| D | — | — | — | — |
| Layer B formulation | | | | |
| A | 100 | 100 | 100 | 99 |
| C | — | — | — | 1 |
| Layer C formulation | | | | |
| A | 92 | 49 | 94 | 65 |
| B | — | 51 | — | 35 |
| C | 8 | — | 6 | — |
| D | — | — | — | — |
| Rmax: Surface A (nm) | 660 | 570 | 540 | 50 |
| Number of projections per mm²: Surface A (number/ mm²) | 401 | 320 | 0 | 0 |
| SRa(A) (nm) | 28 | 35 | 8 | 6 |
| SRa(C) (nm) | 28 | 35 | 8 | 25 |
| Thickness variation (%) | 2 | 2 | 2 | 6 |
| Film haze (%) | 3.5 | 27 | 2.2 | 4.0 |
| Thickness variation of green sheet | B | B | B | D |
| Slurry coatability | D | D | D | A |
| Anti-block properties | A | A | D | A |

What is claimed is:

1. A polyester film for release film, which has a maximum height of projection (Rmax) in one surface (surface A) of said polyester film, of not more than 500 nm; has a number of projections with a height of not less than 350 nm in the surface A, of not more than 200 per mm²; and has a thickness variation defined by the following equation using the maximum, minimum and mean values of film thickness in the machine and transverse directions of said polyester film of not more than 5%:

Thickness variation (%)=(maximum thickness−minimum thickness)×100/average thickness.

2. A polyester film for release film according to claim 1 wherein center plane average roughness of the surface A, SRa (A), is not more than 20 nm, center plane average roughness of the side opposite from the surface A, SRa (C), is 10 to 50 nm, and the relation of SRa (C)≧ SRa (A) is satisfied.

3. A polyester film for release film according to claim 1 wherein film haze is not more than 20%.

4. A polyester film for release film according to claim 1, which has a coextruded laminate structure with two or more layers.

5. A release film for green sheet comprising a polyester film set forth in claim 1, which has a release layer on the surface A.

6. A release film comprising a polyester film and a release layer provided on one surface (surface A) of said polyester film, in which a maximum height of projection (Rmax) in the surface A of said polyester film is not more than 500 nm, a number of projections having a height of not less than 350 nm in the surface A is not more than 200 per mm²; and thickness variation defined by the following equation using the maximum, minimum and mean values of film thickness in the machine and transverse directions of said polyester film of not more than 5%:

$$\text{Thickness variation (\%)} = (\text{maximum thickness} - \text{minimum thickness}) \times 100 / \text{average thickness}.$$

7. A release film according to claim 6 wherein center plane average roughness of the surface A, SRa (A), is not more than 20 nm, center plane average roughness of the side opposite from the surface A, SRa (C), is 10 to 50 nm, and the relation of SRa (C) ≧ SRa (A) is satisfied.

8. A release film according to claim 6 wherein film haze is not more than 20%.

9. A release film according to claim 6 having a coextruded laminate structure with two or more layers.

* * * * *